(12) United States Patent
Zhang et al.

(10) Patent No.: US 12,157,404 B2
(45) Date of Patent: Dec. 3, 2024

(54) CHILD SAFETY SEAT AND SIDE IMPACT PROTECTION DEVICE THEREOF

(71) Applicant: Bambino Prezioso Switzerland AG, Steinhausen (CH)

(72) Inventors: Daliang Zhang, Dongguan (CN); Ruyi Li, Dongguan (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/483,892

(22) Filed: Sep. 24, 2021

(65) Prior Publication Data
US 2022/0097576 A1 Mar. 31, 2022

(30) Foreign Application Priority Data
Sep. 25, 2020 (CN) .......................... 202011030358.0

(51) Int. Cl.
*B60N 2/28* (2006.01)
*B60N 2/42* (2006.01)
*B60N 2/427* (2006.01)

(52) U.S. Cl.
CPC ......... *B60N 2/2884* (2013.01); *B60N 2/2821* (2013.01); *B60N 2/286* (2013.01);
(Continued)

(58) Field of Classification Search
CPC .... B60N 2/2884; B60N 2/286; B60N 2/2863; B60N 2/2821; B60N 2/2872; B60N 2/4235; B60N 2/42709
See application file for complete search history.

(56) References Cited

U.S. PATENT DOCUMENTS 11,338,710 B2 * 5/2022 Zhang ................. B60N 2/2884
2018/0244178 A1 8/2018 Pos
(Continued)

FOREIGN PATENT DOCUMENTS

CA 3217044 A1 10/2022
CN 2567930 Y 8/2003
(Continued)

OTHER PUBLICATIONS

Office Action issued in counterpart German Patent Application No. 10 2021 124 779.9 dated Dec. 21, 2022.
(Continued)

*Primary Examiner* — Anthony D Barfield
(74) *Attorney, Agent, or Firm* — Volpe Koenig

(57) ABSTRACT

A child safety seat and a side impact protection device. The side impact protection device comprises a fixed seat assembled on the backrest and a side impact protection block pivotally coupled to the fixed seat via a pivot shaft. The side impact protection block has at least an extended position and a retracted position during a pivoting process around an axis of the pivot shaft in respect to the fixed seat, one of the fixed seat and the side impact protection block has a locking structure, and the other one of the fixed seat and the side impact protection block has a cooperative locking structure being cooperating with the locking structure, the locking structure is automatically locked with the cooperative locking structure when the side impact protection block is pivoted to the extended position around the axis. The side impact protection device is simple in structure and easy in operation.

15 Claims, 20 Drawing Sheets

(52) U.S. Cl.
CPC ......... *B60N 2/2863* (2013.01); *B60N 2/2872* (2013.01); *B60N 2/4235* (2013.01); *B60N 2/42709* (2013.01)

(56) References Cited

U.S. PATENT DOCUMENTS

| | | | |
|---|---|---|---|
| 2019/0176746 | A1 | 6/2019 | Chen |
| 2020/0101876 | A1* | 4/2020 | Cui |

FOREIGN PATENT DOCUMENTS

| | | | | |
|---|---|---|---|---|
| CN | 104602952 | A | 5/2015 | |
| CN | 108025661 | A | 5/2018 | |
| CN | 207360133 | U | 5/2018 | |
| CN | 108621882 | A | 10/2018 | |
| CN | 109895664 | A | 6/2019 | |
| CN | 109895665 | A | 6/2019 | |
| CN | 110126773 | A | 8/2019 | |
| CN | 110254303 | A | 9/2019 | |
| CN | 110682838 | A | 1/2020 | |
| CN | 110901483 | A | 3/2020 | |
| CN | 110962709 | A | 4/2020 | |
| CN | 210502376 | U | 5/2020 | |
| CN | 111422345 | A | 7/2020 | |
| CN | 114407739 | A | 4/2022 | |
| DE | 3800896 | A1 | 9/1988 | |
| DE | 202012102471 | U1 | 9/2012 | |
| DE | 20 2015 104 791 | U1 | 1/2016 | |
| DE | 102016117312 | A1 | 3/2018 | |
| DE | 20 2013 012 747 | U1 | 3/2019 | |
| DE | 202016008731 | U1 * | 5/2019 | ........... B60N 2/2884 |
| EP | 3495196 | A1 | 6/2019 | |
| EP | 3 666 588 | A1 | 6/2020 | |
| KR | 19980053219 | U | 10/1998 | |
| TW | 202214459 | A | 4/2022 | |
| WO | 2016033738 | A1 | 3/2016 | |
| WO | 2018039208 | A1 | 3/2018 | |

OTHER PUBLICATIONS

Office Action issued in counterpart Taiwanese Application No. 110135464 dated Dec. 12, 2022.

Office Action issued for corresponding CN Application No. 202011030358.0 dated Oct. 30, 2023.

"Second Office Action Issued in Corresponding Chinese Patent Application No. 202011030358.0", Mailed Date: Apr. 25, 2024, 17 pages.

* cited by examiner

FIG.10

CHILD SAFETY SEAT AND SIDE IMPACT PROTECTION DEVICE THEREOF

TECHNICAL FIELD

The disclosure relates to baby products, and particularly a child safety seat and a side impact protection device thereof.

BACKGROUND

It is well known, a child safety seat is a kind of baby product developed by enterprises specifically for young children. Through the use of the child safety seat, the baby may be effectively protected from injuries caused by sudden braking or colliding of the car, so as to ensure the safety of the baby in the car, such that the child safety seats are very popular with people, thereby increasing the popularity of the child safety seats.

At present, for a child safety seat, in order to make the child safety seat have a side impact protection device function, a side impact protection device mechanism is installed on side wings of a backrest of the child safety seat.

However, the existing side impact protection device mechanisms have defects e.g., complicated in structure and inconvenient in operations.

Therefore, it is necessary to provide a child safety seat and its side impact protection device with a simple structure and easy operation to overcome the above-mentioned drawbacks.

SUMMARY

An objection of the disclosure is to provide a side impact protection device which is simple in structure and easy in operation.

The other objection of the disclosure to provide a child safety seat which is simple in structure and easy in operation.

In order to achieve the above objections, the technical solution of the disclosure is to provide a side impact protection device disposed at a backrest of a child safety seat, the side impact protection device comprises a fixed seat assembled on the backrest and a side impact protection block pivotally coupled to the fixed seat via a pivot shaft, the side impact protection block has at least an extended position and a retracted position during a pivoting process around an axis of the pivot shaft in respect to the fixed seat, one of the fixed seat and the side impact protection block has a locking structure, and the other one of the fixed seat and the side impact protection block has a cooperative locking structure being cooperating with the locking structure, the locking structure is automatically locked with the cooperative locking structure when the side impact protection block is pivoted to the extended position around the axis.

Preferably, the fixed seat has an accommodating groove matching the side impact protection block, the side impact protection block has a pivotal assembling end located in the accommodating groove and a free end connected to the pivotal assembling end, the pivot shaft is located at the pivotal assembling end, the free end is embedded into the accommodating groove when pivoting to the retracted position around the axis is, and the free end is rotated out of the accommodating groove when pivoting to the extended position around the axis.

Preferably, the locking structure or the cooperative locking structure provided in the side impact protection block is located at an axial end face of the pivotal assembling end, and the cooperative locking structure or the locking structure provided in the fixed seat is located at a groove side wall of the accommodating groove.

Preferably, the cooperative locking structure is provided by at least two and the least two cooperative locking structures are spaced apart from each other along a circumferential direction of the pivot shaft, the locking structure is automatically locked with one of the cooperative locking structures when the side impact protection block is pivoted to the extended position, and the locking structure is automatically locked with the other one of the cooperative locking structures when the side impact protection block is pivoted to the retracted position.

Preferably, an elastic cantilever is further provided on the axial end face of the pivotal assembling end at which the locking structure is located or on the groove side wall of the accommodating groove, the locking structure is located on the elastic cantilever, and during a process that the side impact protection block is switched between the extended position and the retracted position, the locking structure is unlocked from or locked with the cooperative locking structure by an elastic deformation of the elastic cantilever.

Preferably, the locking structure is a spherical bump and the cooperative locking structure is a recess.

Preferably, one of the pivotal assembling end and the fixed seat has an embedding bulge, and the other one of the pivotal assembling end and the fixed seat has an embedding groove being cooperating with the embedding bulge, the embedding bulge is located in the accommodating groove if the fixed seat has the embedding bulge, or the embedding groove is located at the groove bottom wall of the accommodating groove if the fixed seat has the embedding groove, and the pivot shaft passes through the embedding bulge and is assembled at the groove side wall of the embedding groove.

Preferably, the cooperative locking structure or the locking structure provided in the fixed seat is located at a groove side wall of the embedding groove or an axial end face of the embedding bulge, and the locking structure or the cooperative locking structure provided in the side impact protection block is located at the groove side wall of the embedding groove or the axial end face of the embedding bulge.

Preferably, there are at least two cooperative locking structures and the at least two cooperative locking structures are spaced apart from each other along a circumferential direction of the pivot shaft, the locking structure is automatically locked with one of the cooperative locking structures when the side impact protection block is pivoted to the extended position, and the locking structure is automatically locked with the other one of the cooperative locking structures when the side impact protection block is pivoted to the retracted position.

Preferably, an elastic cantilever is further provided on the groove side wall of the embedding groove at which the locking structure is located or on the axial end face of the embedding bulge, the locking structure is located on the elastic cantilever, and during a process that the side impact protection block is switched between the extended position and the retracted position, the locking structure is unlocked from or locked with the cooperative locking structure by an elastic deformation of the elastic cantilever.

Preferably, the locking structure is a spherical bump and the cooperative locking structure is a recess.

Preferably, the fixed seat has an avoidance space for pulling out the free end of the side impact protection block embedded in the accommodating groove.

Preferably, the embedding bulge has an arched shape.

Preferably, the side impact protection device of the disclosure further comprises a sliding member and an elastic member, the sliding member is slidably arranged on the fixed seat or the side impact protection block at which the embedding groove is located along a direction intersecting an axial direction of the pivot shaft, the elastic member is disposed between the sliding member and the fixed seat or the side impact protection block at which the sliding member is located, the locking structure is formed at an end of the sliding member, the cooperative locking structure is formed on a side wall surface of the embedding bulge, and during a process that the side impact protection block is switched between the extended position and the retracted position, the locking structure is unlocked form or locked with the cooperative locking structure by an elastic deformation of the sliding member being linked with the elastic member.

Preferably, an outer profile of a cross-section of the locking structure is an arc-shaped protrusion, the cooperative locking structure is toothed structure having at least two tooth slots, an axial direction of the toothed structure is the same as an axial direction of the pivot shaft, the protrusion is automatically locked with one of the tooth slots when the side impact protection block is pivoted to the extended position, and the protrusion is automatically locked with the other one of the tooth slots when the side impact protection block is pivoted to the retracted position.

Preferably, there are at least two elastic members and the at least two elastic members are spaced apart along the axial direction of the pivot shaft, and the sliding member has a sleeved post for a sleeved-assembling of the elastic member.

Preferably, a sliding direction of the sliding member is arranged along a radial direction of the pivot shaft, and the sliding member and the elastic member each is built inside the fixed seat or the side impact protection block at which the embedding groove is located.

Preferably, the elastic member is a compression spring.

Preferably, the side impact protection device of the disclosure further comprises a first unlocking operating member linked with the sliding member, the first unlocking operating member is located on the side impact protection block, and the first unlocking operating member makes the locking structure be unlocked from the cooperative locking structure by linking with the sliding member.

Preferably, the first unlocking operating member is located on a side of the side impact protection block facing the groove bottom wall of the accommodating groove.

Preferably, the side impact protection device of the disclosure further comprises a second unlocking operating member, the second unlocking operating member is slidably arranged at one of the fixed seat and the free end and has a buckle structure, the other one of the fixed seat and the free end has a cooperative buckle structure, and the buckle structure is buckled with the cooperative buckle structure when the side impact protection block is pivoted to the retracted position.

Preferably, the second unlocking operating member has an inclined structure being inclined in respect to a sliding direction of the second unlocking operating member, the inclined structure is adjacent to the buckle structure, and during a process that the side impact protection block is pivoted to the retracted position, the free end pushes the inclined structure to slide the second unlocking operating member in a direction away from the free end.

Preferably, the second unlocking operating member further has a limit structure for blocking the second unlocking operating member to a sliding limit toward the free end, and the limit structure is protruded on the second unlocking operating member.

Preferably, the limit structure is a bulge.

Preferably, an elastic reset structure is provided between the second unlocking operating member and the free end or the fixed seat at which the second unlocking operating member is located, the reset structure constantly has a tendency to drive the buckle structure to be automatically buckled with the cooperative buckle structure.

Preferably, the reset structure and the second unlocking operating member jointly form an integral structure.

Preferably, the reset structure is a wave-shaped bending contact strip.

Preferably, the cooperative buckle structure is slotted hole structure.

Preferably, the cooperative locking structure is a slotted hole, and the locking structure is a bulge.

In order to achieve the above the objections, the disclosure provides a child safety seat comprising a seating body and the aforementioned side impact protection device. The seating body has a backrest, and the side impact protection device is disposed on the backrest.

Preferably, the seating body further has side wings extending outward from the backrest, and the side impact protection device is disposed on the side wings.

Compared with the related art, the side impact protection device of the disclosure comprises the fixed seat assembled on the backrest and the side impact protection block pivotally coupled to the fixed seat via a pivot shaft. The side impact protection block has at least an extended position and a retracted position during the process of pivoting around the axis of the pivot shaft in respect to the fixed seat, such that the side impact protection block is out of the fixed seat by pivoting in use, and is stored in the fixed seat by pivoting while not in use, so the operation is simple and the structure is simple. Meanwhile, since one of the fixed seat and the side impact protection block has the locking structure, and the other one of the fixed seat and the side impact protection block has the cooperative locking structure cooperating with the locking structure, the locking structure may be automatically locked with the cooperative locking structure when the side impact protection block is pivoted to the extended position around the axis, which on the one hand ensures the reliability of the side impact protection block in use, and on the other hand makes the locking of the side impact protection block in the extended position easier and faster.

BRIEF DESCRIPTION OF THE DRAWINGS

FIG. 10 is an exploded perspective structural view of the side impact protection device shown in FIG. 8.

DETAILED DESCRIPTION

Now embodiments of the disclosure will be described with reference to the drawings, in which similar element numbers represent similar elements.

Figure 1:
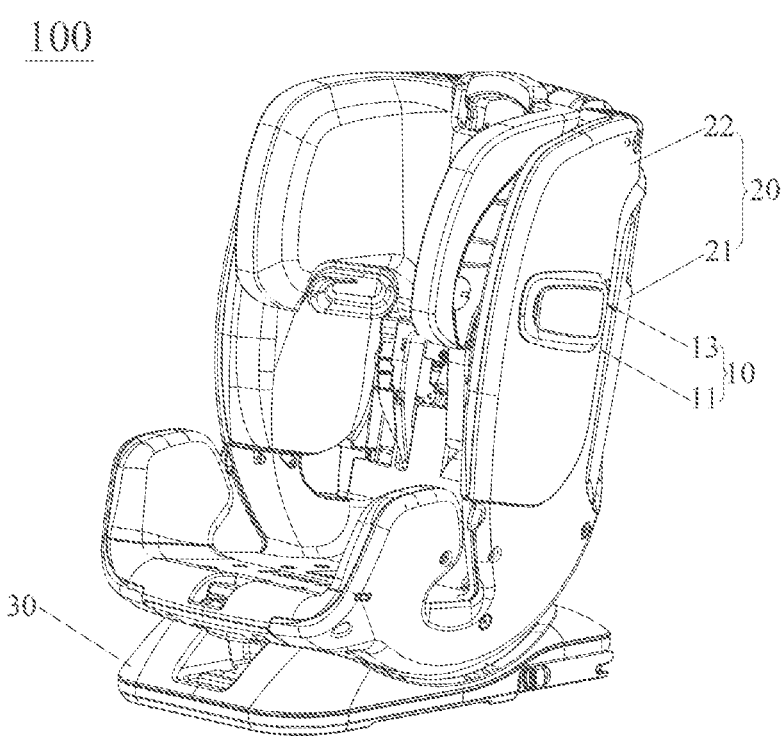
FIG. 1 is a perspective structural view of a child safety seat installed with a side impact protection device according to a first embodiment of the disclosure when a side impact protection block is in a retracted position.
Figure 2:
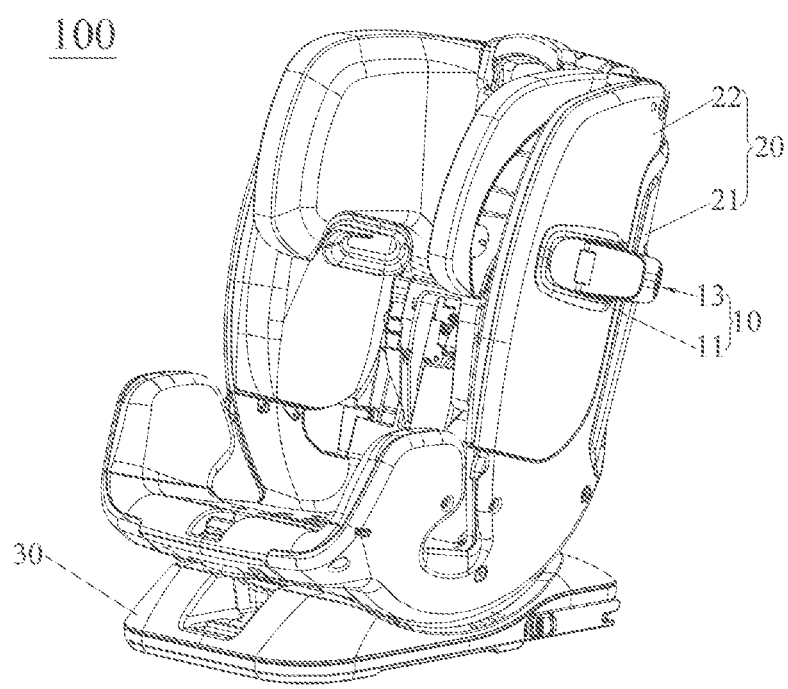
FIG. 2 is a perspective structural view of a child safety seat installed with a side impact protection device according to a first embodiment of the disclosure when the side impact protection block is in an extended position.

Referring to FIGS. 1 and 2, a child safety seat 100 of the disclosure comprises a side impact protection device 10, a seating body 20, and a base 30. The base 30 is fixedly coupled to a car seat by using an IOSFIX interface. Of course, the base may also be fixedly coupled to the car seat by using a seat belt or by other means, but this is well known in the art, and so the disclosure is not limited here. Moreover, the seating body 20 is assembled on the base 30, such that the seating body 20 may have a forward use position or a backward use position in respect to the base 30. The seating body 20 may have a backrest 21, and the side impact protection device 10 may be disposed on the backrest 21. Specifically, the seating body 20 may also have side wings 22 extending outward from the backrest 21. In those embodiments, the side impact protection device 10 is disposed on the side wings 22, in order to provide a better side impact protection effect. Preferably, because backrest 21 has the side wings 22 respectively extend outward from left and right sides thereof, the side impact protection device 10 is provided to the side wings 22 on every side, so as to provide a side impact effect for the left and right sides of the child safety seat 100. It would be appreciated, according to actual requirements, as long as the seating body 20 can be fixedly coupled to the car seat by using an IOSFIX interface, seat belt or other means, the base 30 may be omitted, so the disclosure is not limited to the above example.

Figure 3:
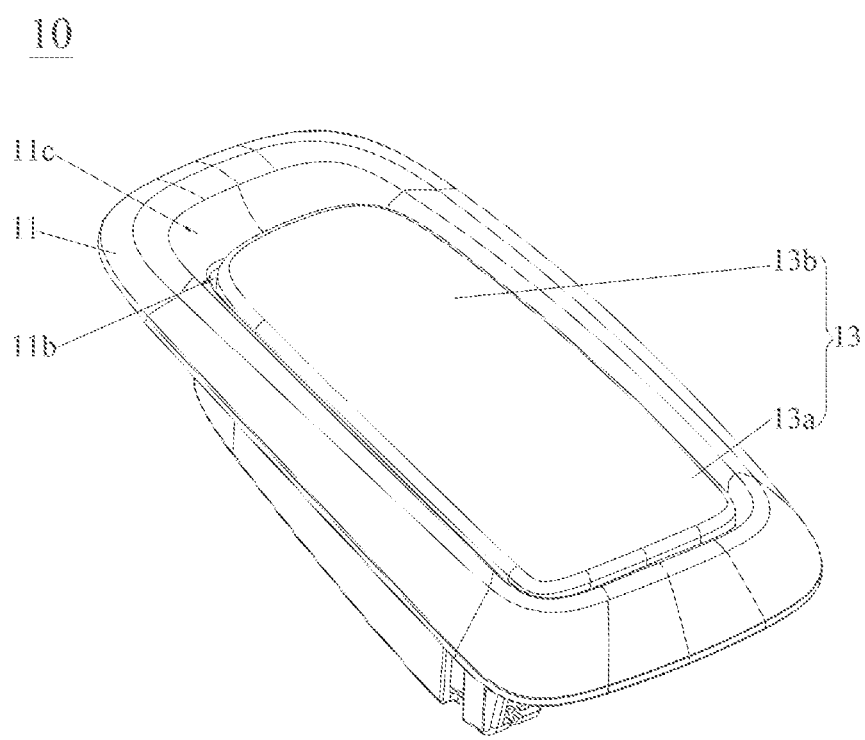
FIG. 3 is a perspective structural view of the side impact protection device according to the first embodiment of the disclosure when the side impact protection block is in the retracted position.
Figure 4:
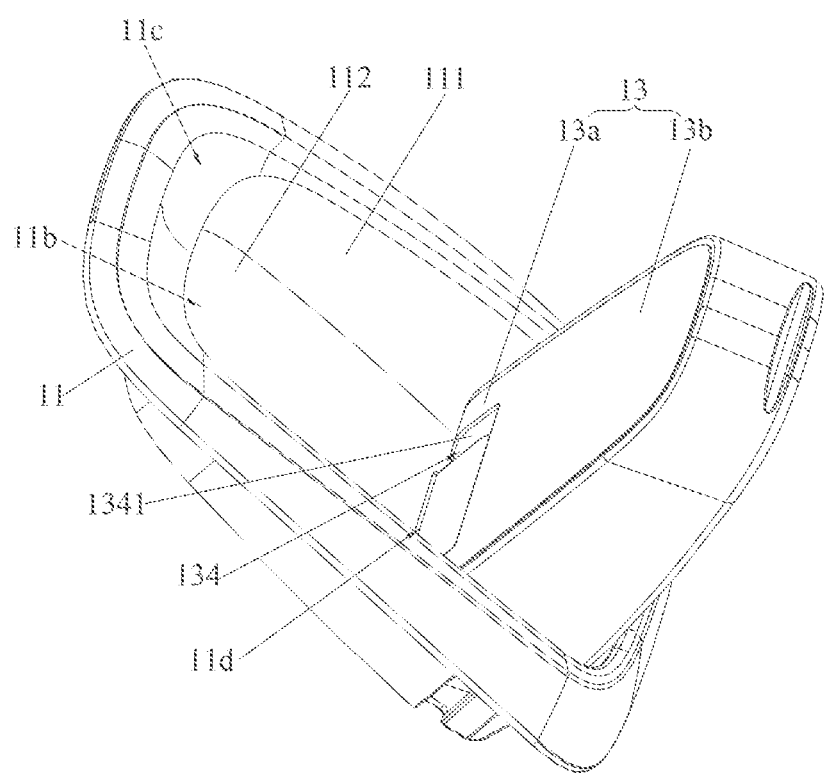
FIG. 4 is a perspective structural view of the side impact protection device according to the first embodiment of the disclosure when the side impact protection block is in the extended position.

With reference to FIGS. 3 to 7, the side impact protection device 10 comprises a fixed seat 11 assembled on the backrest 21 and a side impact protection block 13 pivotally coupled to the fixed seat 11 via a pivot shaft 12. The side impact protection block 13 has at least an extended position as shown in FIG. 2 or 4 and a retracted position as shown in FIG. 1 or 3 during pivoting around an axis C of the pivot shaft 12 in respect to the fixed seat 11. The side impact protection block 13 has a locking structure 131, and the fixed seat 11 has a cooperative locking structure 11a which is cooperating with the locking structure 131. The locking structure 131 is automatically locked with the cooperative locking structure 11a when the side impact protection block 13 is pivoted to the extended position as shown in FIG. 4 around the axis C, so as to prevent accidental retraction of the side impact protection block 13 at the extended position, thereby ensuring the reliability of the operation of the side impact protection block 13 in the extended position. Specifically, the fixed seat 11 is assembled at the side wings 22 extending from the backrest 21. Preferably, the fixed seat 11 is also transversely placed at the side wings 22. The purpose of this arrangement is to make the pivot shaft 12 arranged in an up and down direction of the backrest 21, such that the side impact protection block 13 may be pivoted forward or backward around the axis C, but the disclosure is not limited to this. It would be appreciated, according to actual requirements, the locking structure 131 may be disposed in the fixed seat 11, and accordingly, the cooperative locking structure 11a may be disposed in the side impact protection block 13, in this way, the purpose that the locking structure 131 is automatically locked with the cooperative locking structure 11a when the side impact protection block 11 is pivoted to the extended position can also be achieved, so the disclosure is not limited to this.

Figure 5:
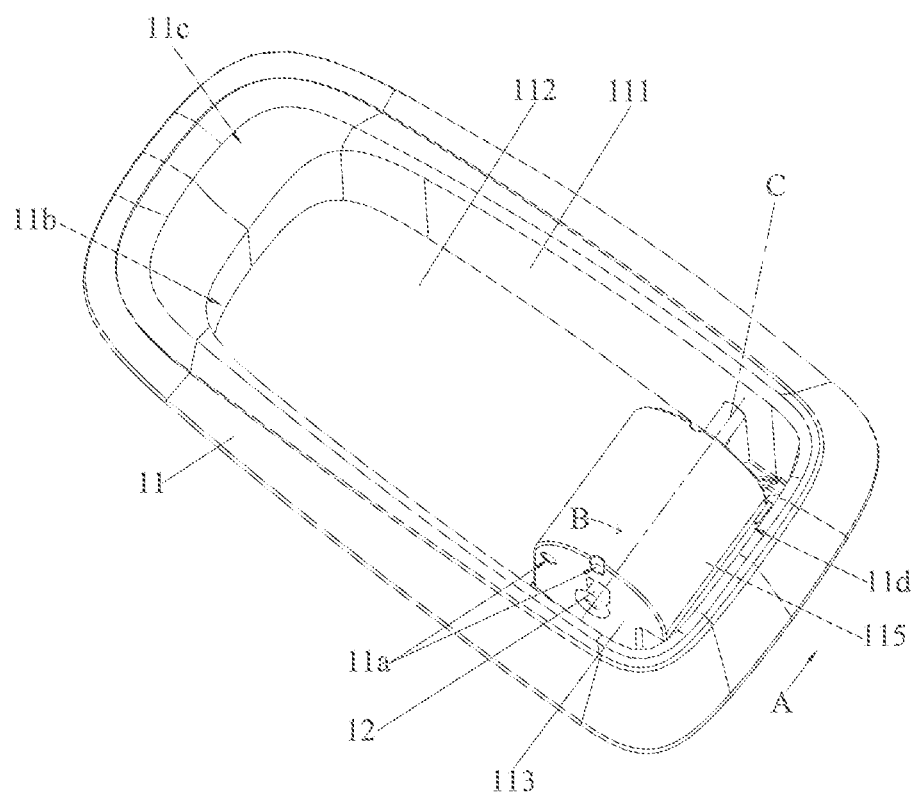
FIG. 5 is a perspective structural view of the side impact protection device shown in FIG. 4 after the side impact protection block is hidden.
Figure 6:
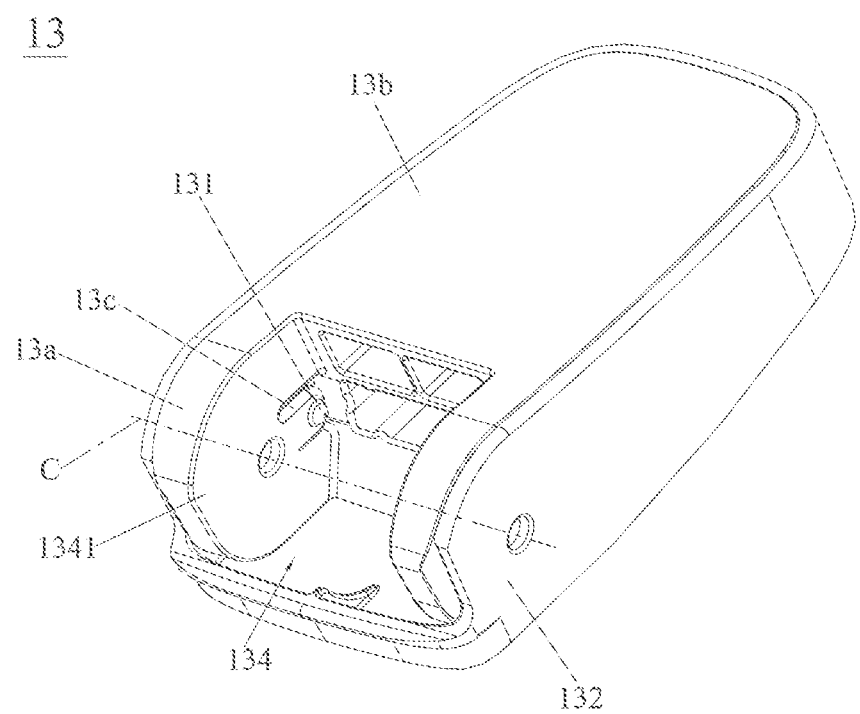
FIG. 6 is a perspective structural view of the side impact protection device shown in FIG. 4 after a fixed seat is hidden.
Figure 7:
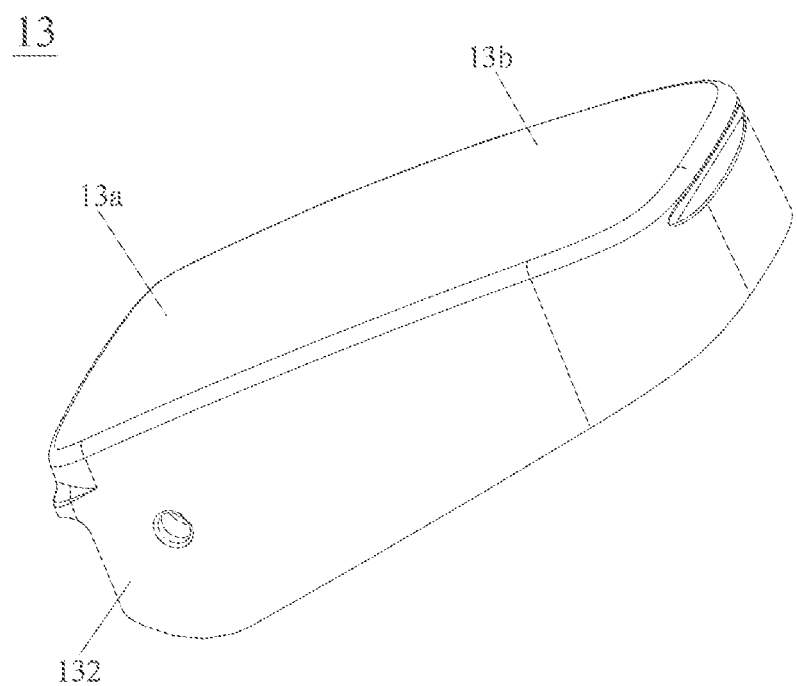
FIG. 7 is a perspective structural view of the side impact protection device shown in FIG. 6 at another angle.

As shown in FIGS. 3 to 5, the fixed seat 11 has an accommodating groove 11b matching the side impact protection block 13, and the side impact protection block 13 has a pivotal assembling end 13a located in the accommodating groove 11b and a free end 13b connected to the pivotal assembling end 13a. The pivot shaft 12 is located at the pivotal assembling end 13a, and the free end 13b is inserted into the accommodating groove 11b when it is pivoted to the retracted position around the axis C, such state is shown in FIG. 3. The free end 13b is rotated out of the accommodating groove 11b when it is pivoted to the extended position around the axis C, such state is shown in FIG. 4. Therefore, by arrangement of the accommodating groove 11b, the side impact protection block 13, when it is not in use, can be stored in the fixed seat 11, so the appearance is cleaner. Specifically, the fixed seat 11 has an embedding bulge 11d located in the accommodating groove 11b. Preferably, the embedding bulge 11d has an arched shape, such that an outer profile of a cross-section of the embedding bulge 11d is shaped circular, thereby reducing occupation of the radial space. Of course, the embedding bulge 11d may have some other shape, so the disclosure is not limited to this. The pivotal assembling end 13a may have an embedding groove 134 cooperating with the embedding bulge 11d. The pivot shaft 12 passes through the embedding bulge 11d and is assembled at a groove side wall 1341 of the embedding groove 134, wherein its state of passing through the embedding bulge 11d is shown in FIG. 5, and its state of being assembled at the groove side wall 1341 of the embedding groove 134 is shown in FIG. 6. Therefore, by cooperation of the embedding bulge 11d and the embedding groove 134, the pivotally assembling between the pivotal assembling end 13a and the fixed seat 11 is more compact and reliable. More specifically, the cooperative locking structure 11a is located at an axial end face 113 of the embedding bulge 11d, and the locking structure 131 is located at the groove side wall 1341 of the embedding groove 134, which is more convenient for locking between the cooperative locking structure 11a and the locking structure 131. In order to better realize an automatic locking between the locking structure 131 and the cooperative locking structure 11a, and to facilitate an extending or retracting operation of the side impact protection block 13. In FIG. 6, an elastic cantilever 13c is further disposed on the groove side wall 1341 of the embedding groove 134 at which the locking structure 131 is located. The locking structure 131 is located on the elastic cantilever 13c, so during the process of the side impact protection block 13 switching between the extended position and the retracted position, the locking structure 131 may be unlocked or locked with the cooperative locking structure 11a by an elastic deformation of the elastic cantilever 13c, thereby facilitating the operator to extend and retract the side impact protection block 13. In order to make the side impact protection block 13 in the retracted position be locked too, in FIG. 5, there are at least two cooperative locking structures 11a, and the at least two cooperative locking structures 11a are spaced apart from each other along a circumferential direction of the pivot shaft 12 (see the direction indicated by arrow B in FIG. 5). The locking structure 131 is automatically locked with one of the cooperative locking structures 11a when the side impact protection block 13 is pivoted to the extended position, and the locking structure 131 is automatically locked with the other one of the cooperative locking structures 11a when the side impact protection block 13 is pivoted to the retracted position. For example, in FIG. 6, the locking structure 131 is provided as a spherical bump, and the cooperative locking structures 11a each is provided as a recess, such that the extending operation of the side impact protection block 13 may be performed more easily, i.e., when the operator pivots the side impact protection block 13 around the axis C by pulling, the locking structure 131 is pushed by the cooperative locking structures 11a and is retracted inwardly together with the elastic cantilever 13c, such that the locking structure 131 and the cooperative locking structure 11a are unlocked, thereby allowing the side impact protection block 13 in the extended position to be switched to the retracted position. Of course, according to actual requirements, the cooperative locking structure 11a and the locking structure 131 may be provided differently, so the disclosure is not limited to this. In order to facilitate pulling out the side impact protection block 13 in the retracted position, in FIGS. 3 to 5, an avoidance space 11c is disposed in the fixed seat 11 for pulling the free end 13a of the side impact protection block 13 embedded in the accommodating groove 11b. It would be appreciated, when the pivotal assembling end 13a includes the embedding bulge 11d and the fixed seat includes the embedding groove 134, the embedding groove 134 is located at a groove bottom wall 112 of the accommodating groove 11b, and similarly, the purpose of "making the pivotally assembling between the pivotal assembling end 13a and the fixed seat 11 more compact and reliable by the cooperation of the embedding bulge 11d and the embedding groove 134" may be achieved also. It should be noted, when the fixed seat 11 includes the embedding bulge 11d, the cooperative locking structure 11a or the locking structure 131 provided in the fixed seat 11 is located at the axial end face 113 of the embedding bulge 11d; when the fixed seat 11 includes the embedding groove 134, the cooperative locking structure 11a or the locking structure 131 provided in the fixed seat 11 is located at the groove side wall 1341 of the embedding groove 134. Moreover, when the pivotal assembling end 13a includes the embedding groove 134, the locking structure 131 or the cooperative locking structure 11a provided in the side impact protection block 13 is located at the groove side wall 1341 of the embedding groove 134; and when the pivotal assembling end 13a includes the embedding bulge 11d, the locking structure 131 or the cooperative locking structure 11a provided in the side impact protection block 13 is located at the axial end face 113 of the embedding bulge 11d. Furthermore, when the locking structure 131 is located at the groove side wall 1341 of the embedding groove 134, the elastic cantilever 13c is provided in the groove side wall 1341; and when the locking structure 131 is located at the embedding bulge 11d, the elastic cantilever 13c is provided in the axial end face 113 of the embedding bulge 11d.

With reference to FIGS. 3 to 7, the working principle of the side impact protection device of the first embodiment of the disclosure will be described as follows. When the side impact protection block 13 is to be switched from the state shown in FIG. 3 to the state shown in FIG. 4, the operator may apply a clockwise force to the side impact protection block 13 shown in FIG. 3, such that the side impact protection block 13 is pivoted to the extended position shown in FIG. 4 around the axis C of the pivot shaft 12. At this time, the locking structure 131 automatically locks with the aligned cooperative locking structure 11a under the action of an elastic force applied by the elastic cantilever 13c, and such state is shown in FIG. 4. When the side impact protection block 13 is to be pivoted from the state shown in FIG. 4 to the state shown in FIG. 3, a counterclockwise force may be applied to the side impact protection block 13 shown in FIG. 4, such that the side impact protection block 13 is pivoted to the retracted position shown in FIG. 3 around the axis C of the pivot shaft 12. At this time, the locking structure 131 automatically locks with the aligned cooperative locking structure 11a under the action of the elastic force applied by the elastic cantilever 13c, and such state is shown in FIG. 3. It should be noted, during the process of the side impact protection block 13 switching between the retracted position and the extended position, the cooperative locking structure 11a may push the locking structure 131 to retract inwardly together with the elastic cantilever 13c, and under the action of the elastic force applied by the elastic cantilever 13c, causes the locking structure 131 to slide along the axial end face 113 of the embedding bulge 11d.

Referring to FIGS. 8 to 12, the side impact protection device 10' of the second embodiment has a structure basically as same as that of the side impact protection device 10 of the first embodiment, with the following differences:

(1) In the second embodiment, the side impact protection device 10' further comprises a sliding member 14 and an elastic member 15. The sliding member 14 is slidably arranged, along an axial direction of the pivot shaft 12 (i.e., the direction indicated by arrow A and the opposite direction), on the side impact protection block 13 at which the embedding groove 134 is located. Preferably, a sliding direction of the sliding member 14 (i.e., the direction indicated by the arrow in the sliding member 14 in FIG. 9 and the opposite direction) is arranged along an axial direction of the pivot shaft 12. The elastic member 15 is disposed between the sliding member 14 and the side impact protection block 13, and the locking structure 131' is formed at an end of the sliding member 14, as well as the cooperative locking structure 11a' is formed on a side wall surface 115 of the embedding bulge 11d. Moreover, during the process of the side impact protection block 13 switching between the extended position and the retracted position, the locking structure 131' is unlocked or locked with the cooperative locking structure 11a' by means of the sliding member 14 and the elastic deformation of the elastic member 15. That is, during the process that the operator pivoting the side impact protection block 13 around axis C, the cooperative locking structure 11a' pushes the locking structure 131' and the sliding member 14 to retract inwardly together by overcoming the elastic force of the elastic member 15, such that the locking structure 131' slides along the side wall surface 115 of the embedding bulge 11d during the process of following the side impact protection block 13 to pivot. Specifically, the sliding member 14 and the elastic member 15 are each built inside the side impact protection block 13 at which the embedding groove 134 is located. In the first embodiment, the side impact protection device 10 does not comprise the sliding member 14 and the elastic member 15, moreover, the cooperative locking structure 11a is located at the axial end face 113 of the embedding bulge 11d, the locking structure 131 is located on the elastic cantilever 13c, and the elastic cantilever 13c is provided by the groove side wall 1341 of the embedding groove 134.

Figure 9:
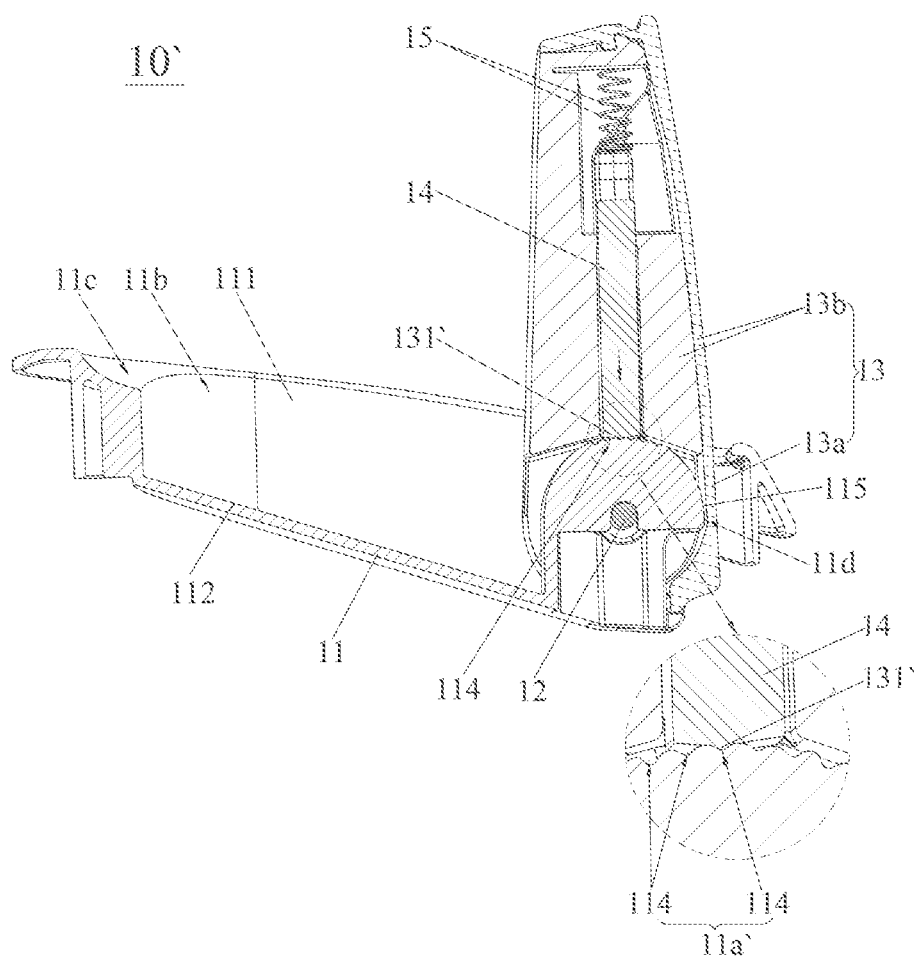
FIG. 9 is a schematic view of an internal structure of the side impact protection device shown in FIG. 8 after being cut by its longitudinal bisecting plane.
Figure 11:
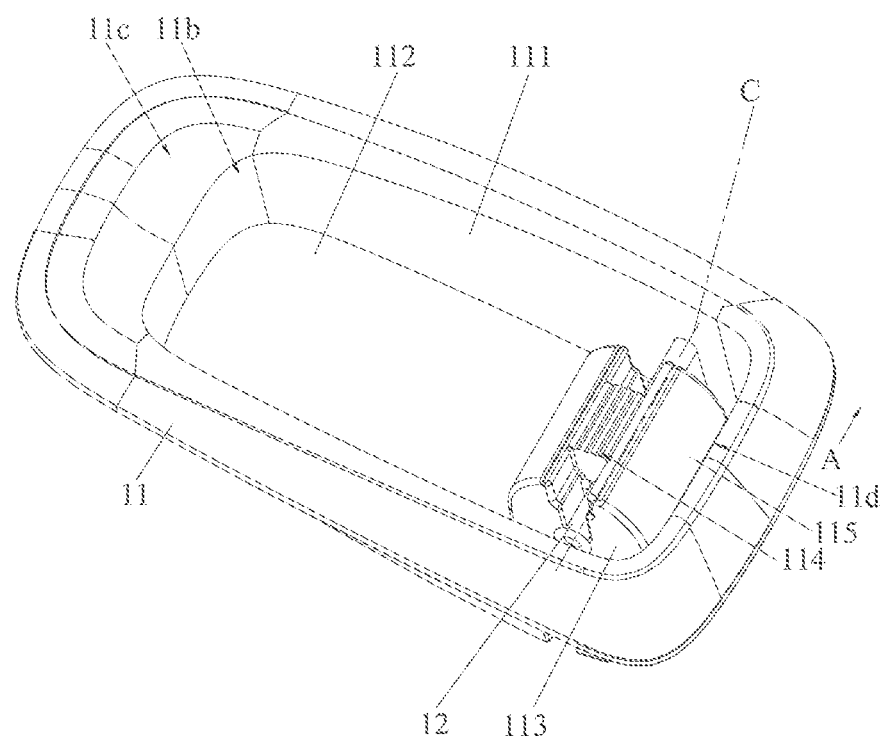
FIG. 11 is a perspective structural view of the side impact protection device shown in FIG. 8 after the side impact protection block as well as a sliding member and an elastic member on the side impact protection block are hidden.
Figure 12:
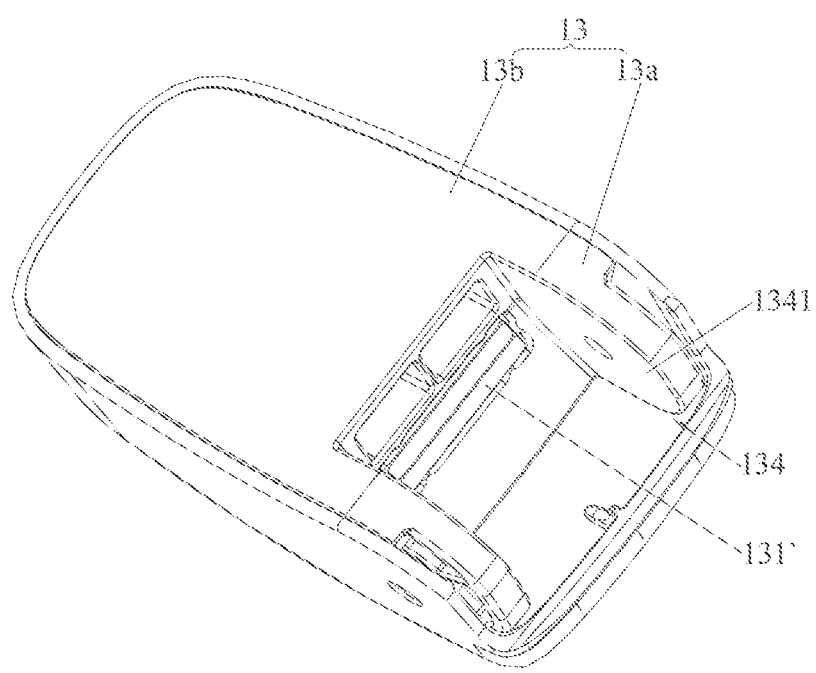
FIG. 12 is a perspective structural view of the side impact protection device shown in FIG. 8 after the fixed seat is hidden.

(2) In the second embodiment, in FIG. 9, an outer profile of a cross-section of the locking structure 131' is an arc-shaped protrusion, and the cooperative locking structure 11a' is a toothed structure having at least two tooth slots 114. The axial direction of the toothed structure is the same as the axial direction of the pivot shaft 12, so the protrusion is automatically locked with one of the tooth slots 114 when the side impact protection block 13 is pivoted to the extended position, such state is shown in FIG. 9; moreover, the protrusion is locked with the other one of the tooth slots 114 when the side impact protection block 13 is pivoted to the retracted position, so as to accidental movement of the side impact protection block 13 in the extended or retracted position. While in the first embodiment, the locking structure 131 is a spherical bump, and the cooperative locking structure 11a is a recess.

Figure 10:
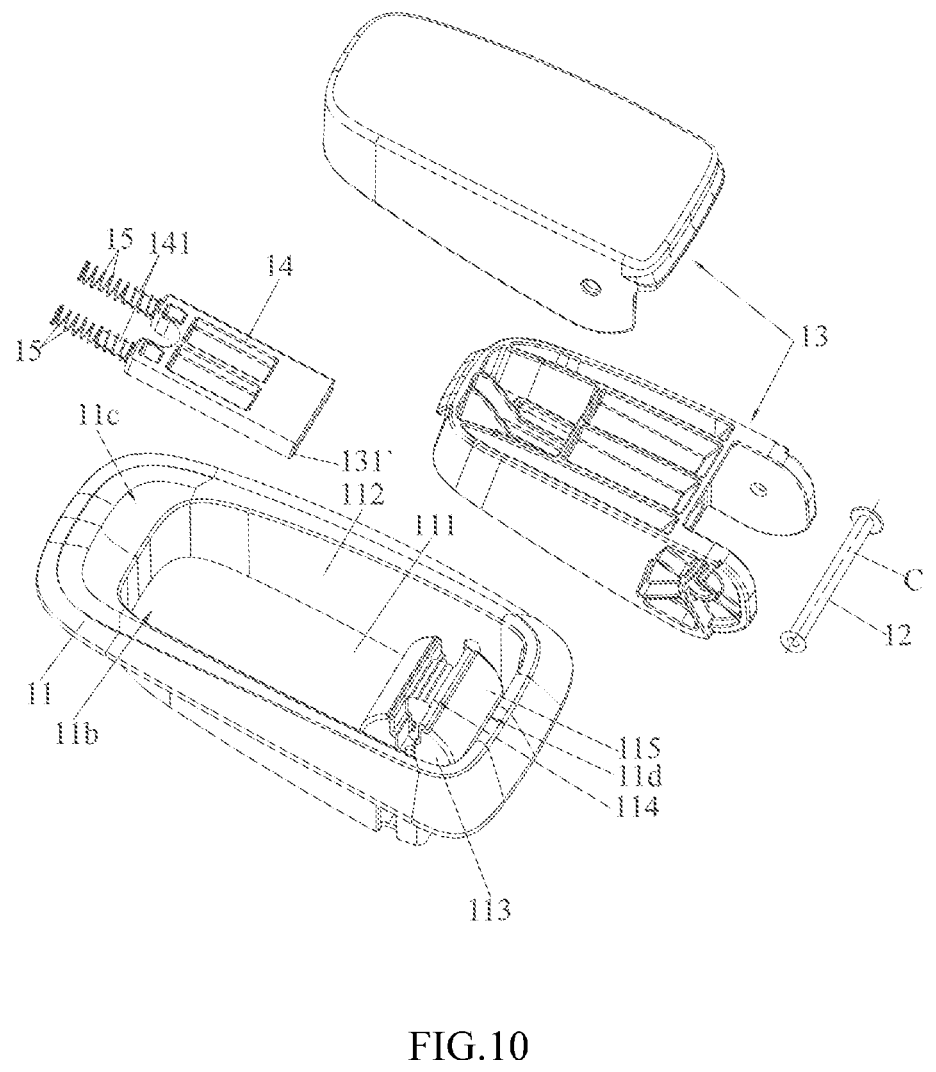

(3) In the second embodiment, as shown in FIG. 10, the elastic member 15 is provided by two, and the two elastic members are spaced apart along the axial direction of the pivot shaft 12. The sliding member 14 has a sleeved post 141 for sleeved-assembling of the elastic member 15, in order to improve the assembling reliability between the sliding member 14 and the elastic member 15. For example, elastic member 15 may be a compression spring, but the disclosure is not limited to this. It would be appreciated, the number of the elastic members 15 may also be one or more, so the disclosure is not limited thereto.

Except for the above differences, the rest is the same as the first embodiment, so it will not be redundantly described here. It should be noted, when the fixed seat 11 includes the embedding groove 134, the sliding member 14 is slidably arranged on the fixed seat 11, and the elastic member 15 is disposed between the sliding member 14 and the fixed seat 11. Preferably, the sliding member 14 and the elastic member 15 are built inside the fixed seat 11, so the disclosure is not limited to the above example.

Figure 8:
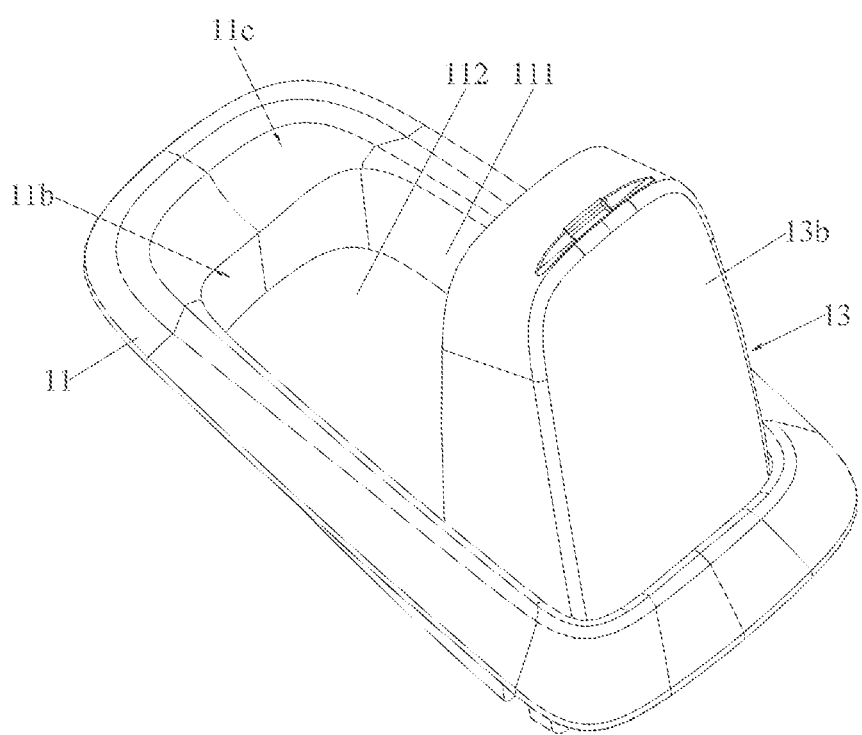
FIG. 8 is a perspective structural view of the side impact protection device according to a second embodiment of the disclosure when the side impact protection block is in the extended position.

With reference to FIGS. 8 to 12, the working principle of the side impact protection device of the second embodiment of the disclosure will be described as follows. When the side impact protection block 13 in the retracted position shown in FIG. 10 is to be pivoted around the axis C of the pivot shaft 12 to the extended position shown in FIG. 8 or 9, the operator may apply a clockwise force to the side impact protection block 13 shown in FIG. 10, such that the locking structure 131' of the side impact protection block 13, under the pushing action of the cooperative locking structure 11a' aligned therewith, may retract inwardly together with the sliding member 14 to overcome the elastic force of the elastic member 15, thus the locking structure 131' slides on the side wall surface 115 of the embedding bulge 11d during the pivoting process of following the side impact protection block 13, until the locking structure 131' locks with the aligned cooperative locking structure 11a' again, and such state is shown in FIG. 8. When the side impact protection block 13 in the state shown in FIG. 8 or 9 is to be switched to the retracted position, the operator may apply a counter-clockwise force to the side impact protection block 13 shown in FIG. 8 or 9, such that the locking structure 131' of the side impact protection block 13, under the pushing action of the aligned cooperative locking structure 11a,' may retract inwardly together with the sliding member 14 to overcome the elastic force of the elastic member 15, thus the locking structure 131' slides on the side wall surface 115 of the embedding bulge 11d during the pivoting process of following the side impact protection block 13, until the locking structure 131' locks with the aligned cooperative locking structure 11a'.

Figure 16:
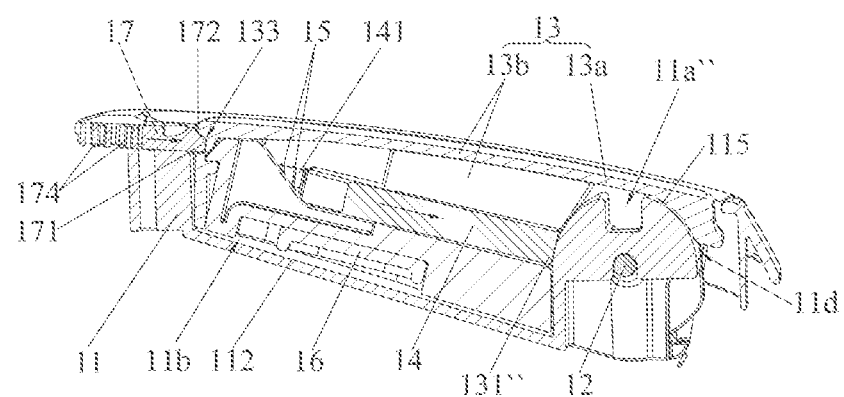
FIG. 16 is a schematic view of an internal structure of the side impact protection device shown in FIG. 14 after being cut by its longitudinal bisecting plane.
Figure 17:
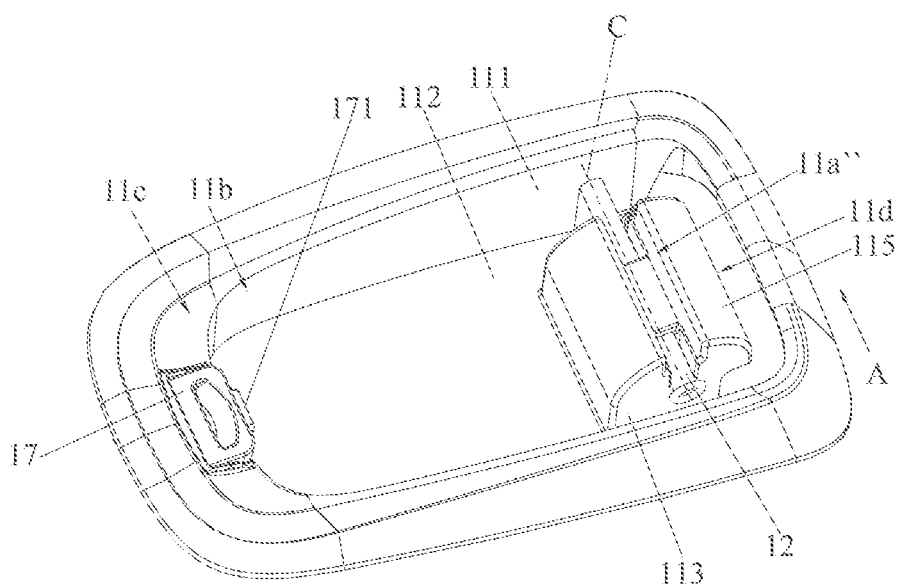
FIG. 17 is a perspective structural view of the side impact protection device shown in FIG. 14 after the side impact protection block as well as the elastic member, the sliding member and a first unlocking operating member on the side impact protection block are hidden.
Figure 18:
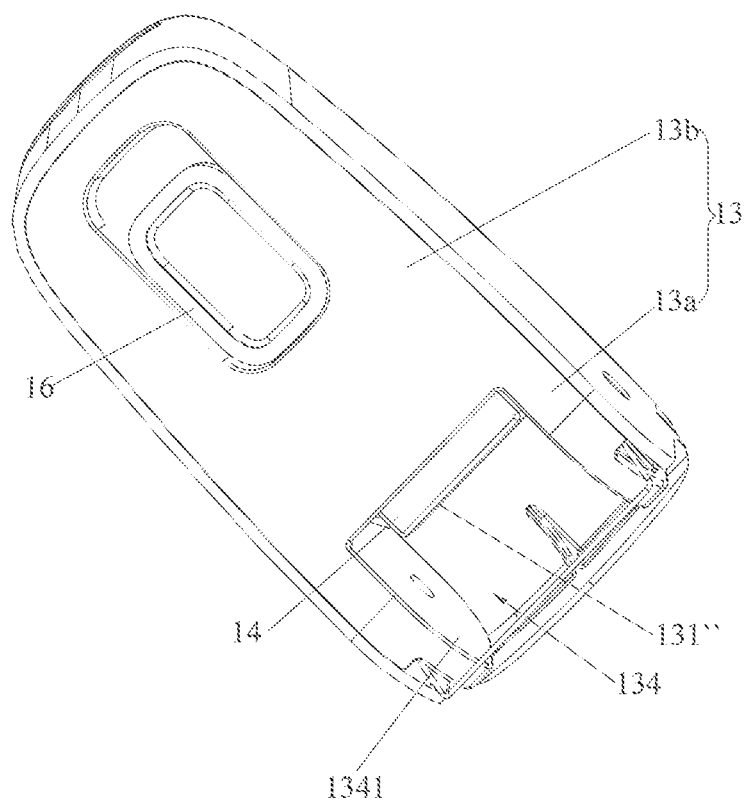
FIG. 18 is a perspective structural view of the side impact protection device shown in FIG. 14 after the fixed seat and a second unlocking operating member are hidden.
Figure 19:
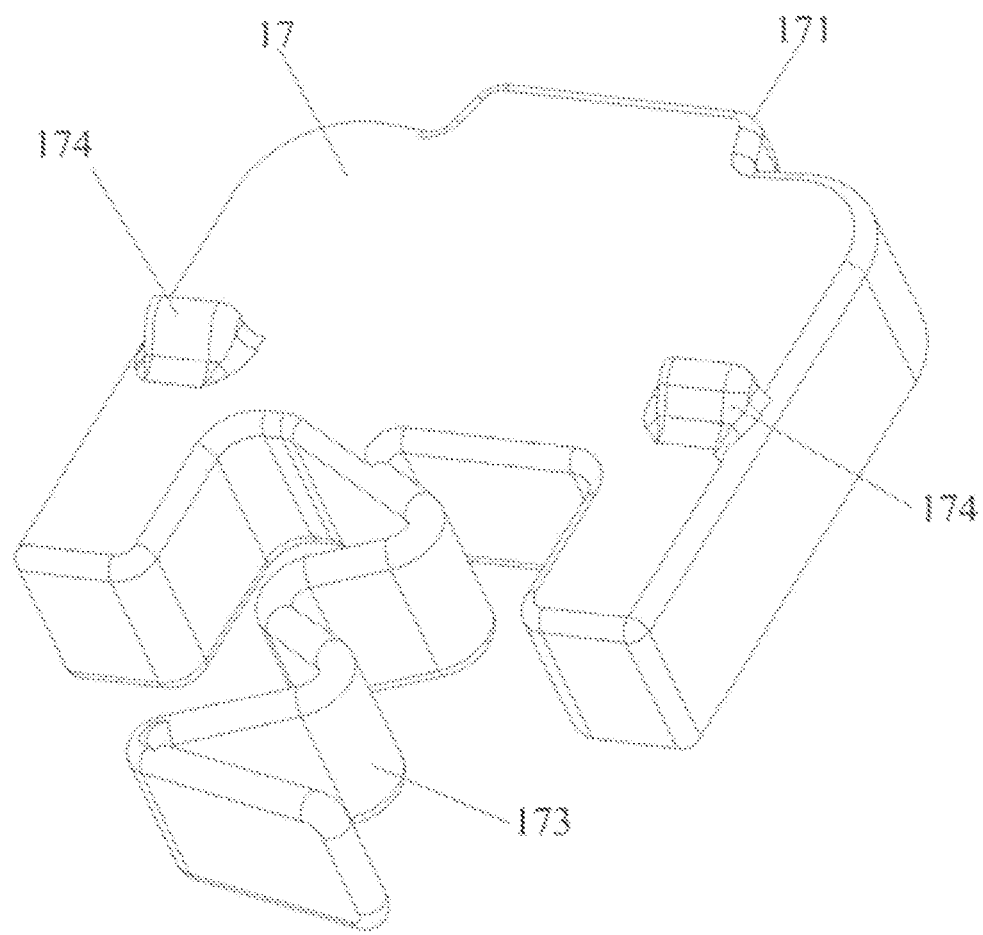
FIG. 19 is a perspective structural view of the second unlocking operating member in the side impact protection device according to the third embodiment of the disclosure.
Figure 20:
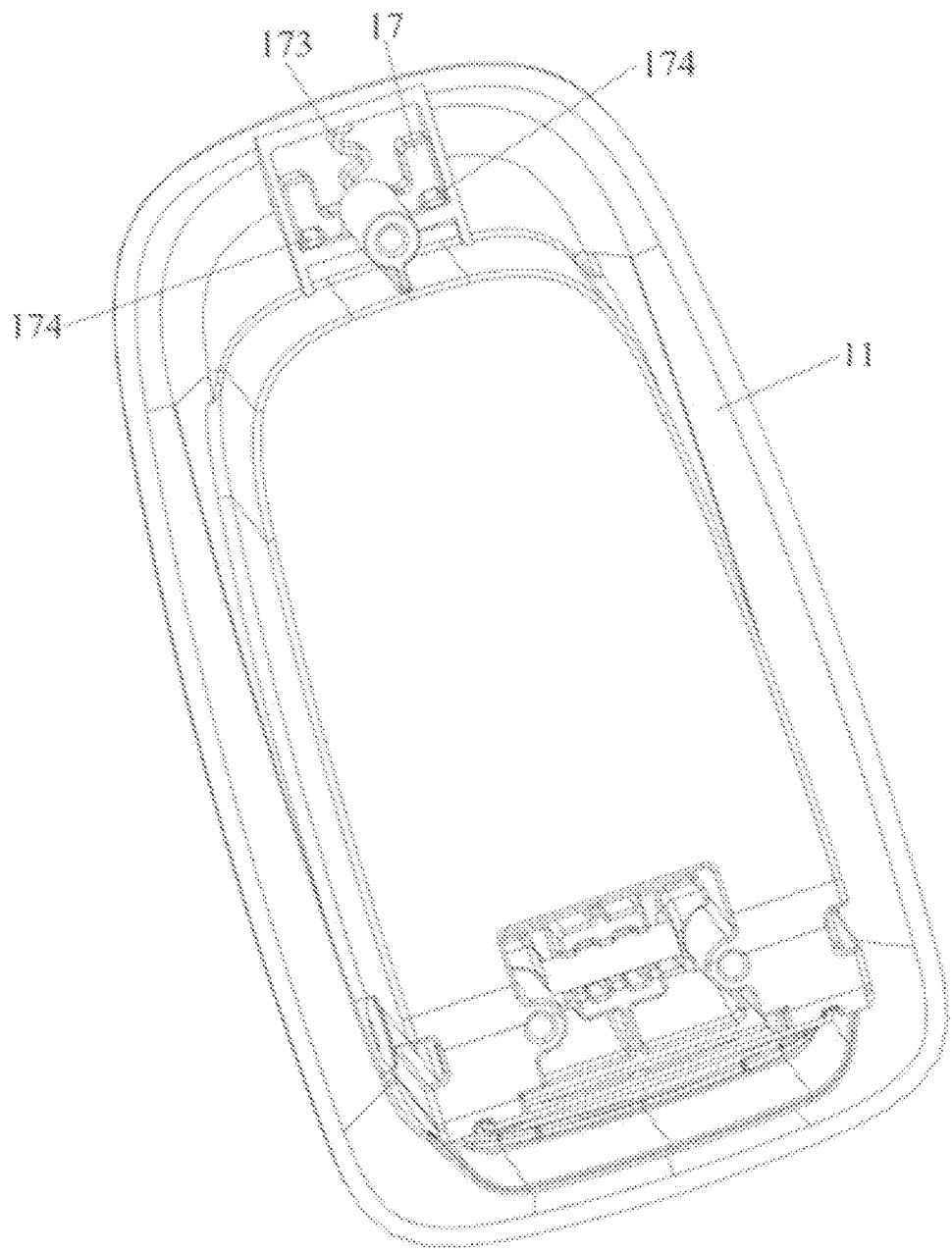
FIG. 20 is a perspective structural view of the second unlocking operating member and the fixed seat in the side impact protection device according to the third embodiment of the disclosure after being assembled together.

Referring to FIGS. 13 to 20, the side impact protection device 10" of the third embodiment has a structure basically as same as that of the side impact protection device 10' of the second embodiment, with the following differences:

(1) In the third embodiment, the side impact protection device 10" further comprises a first unlocking operating member 16 and a second unlocking operating member 17. The first unlocking operating member 16 is linked with the sliding member 14, and the first unlocking operating member 16 drives the sliding member 14 to slide. The first unlocking operating member 16 is located on the side impact protection block 13. Preferably, the first unlocking operating member 16 is located on the side of the side impact protection block 13 facing the groove bottom wall 112 of the accommodating groove 11b, such that the first unlocking operating member 16 is covered by the side impact protection block 13 when the side impact protection block 13 is in the retracted position. Moreover, the first unlocking operating member 16, being linked with the sliding member 14, may unlock the locking structure 131" from the cooperative locking structure 11a" by sliding of the sliding member 14, that is, the unlocking of the locking structure 131" and the cooperative locking structure 11a" in the third embodiment is performed by the operation of the first unlocking operating member 16 by the operator. Meanwhile, the second unlocking operating member 17 is slidably arranged at the fixed seat 11 and includes a buckle structure 171, and the free end 13b includes a cooperative buckle structure 133. The buckle structure 171 is buckled with the cooperative buckle structure 133 when the side impact protection block 13 is pivoted to the retracted position, and such state is shown in FIG. 16, so as to prevent accidental movement of the side impact protection block 13 in the retracted position. Specifically, the second unlocking operating member 17 includes an inclined structure 172 which is inclined in respect to the sliding direction of the second unlocking operating member 17 (see the direction indicated by the arrow in the second unlocking operating member 17 and the opposite direction in FIG. 16). The inclined structure 172 is adjacent to the buckle structure 171, so during the process that the side impact protection block 13 is pivoted to the retracted position, the free end 13b makes the second unlocking operating member 17 slide in a direction away from the free end 13b by pushing the inclined structure 172, such that the second unlocking operating member 17 may be more convenient for the automatic buckling operation of the free end 13b, but the disclosure is not limited to this. In order to make the second unlocking operating member 17 constantly have a tendency to slide toward the free end 13b, an elastic reset structure 173 is disposed between the second unlocking operating member 17 and the fixed seat 11. The reset structure 173 constantly have a tendency to drive the buckle structure 171 being automatically buckled with the cooperative buckle structure 133. Preferably, the reset structure 173 and the second unlocking operating member 17 jointly form an integral structure, so as to simplify the assembling structure between them. For example, the reset structure 173 may be a wave-shaped bending contact strip, so as to provide a more reliable reset force for the second unlocking operating member 17, but the disclosure is not limited to this. In order to prevent the second unlocking operating member 17 from accidentally sliding out of the fixed seat 11, the second unlocking operating member 17 further includes a limit structure 174 for blocking the second unlocking operating member 17 to a sliding limit toward the free end 13b. The limit structure 174 is protruded on the second unlocking operating member 17 for forming a blocking cooperation with the fixed seat 11, and the state of their blocking cooperation is shown in FIG. 20. For example, the limit structure 174 may be a bulge, and the cooperative buckle structure 133 may be slotted hole structure, but the disclosure is not limited to this. It would be appreciated, according to actual requirements, the second unlocking operating member 17 may be slidably arranged on the free end 13b. When the second unlocking operating member 17 is slidably arranged on the free end 13b, the cooperative buckle structure 133 is provided by the fixed seat 11, which can also achieve the purpose of make the buckle structure 171 and the cooperative buckle structure 133 be buckled to each other. Furthermore, when the second unlocking operating member 17 is slidably arranged on the free end 13b, the reset structure 173 is disposed between the second unlocking operating member 17 and the free end 13b, and the limit structure 174 is used to form a blocking cooperation with the free end 13b, so the disclosure is not limited to the above example.

While in the second embodiment, the side impact protection device 10' does not comprise the first unlocking operating member 16, the reset structure 173 and the second unlocking operating member 17.

(2) In the third embodiment, the number of each of cooperative locking structure 11a" and the locking structure 131" are one. For example, the cooperative locking structure 11a" may be a slotted hole, and the locking structure 131" may be a bulge. Since either the locking structure 131" or the cooperative locking structure 11a" is provided by one, and the one locking structure and the one cooperative locking structure are locked to each other when the side impact protection block 13 is in the extended position, accordingly, when the side impact protection block 13 is in the retracted position, the locking structure 131" may remains in a state of abutting on the side wall surface 115 of the embedding bulge 11d under the action of the elastic member 15, as shown in FIG. 16. Moreover, in the second embodiment, the cooperative locking structure 11a' is a toothed structure having at least two tooth slots 114, and the outer profile of the cross-section of the locking structure 131' is an arc-shaped protrusion, so when the side impact protection block 13 is in the extended or retracted position, the locking structure 131' locks with one of the tooth slots 114.

Except for the above difference, the rest is the same as the second embodiment, so it will not be redundantly described here.

Figure 13:
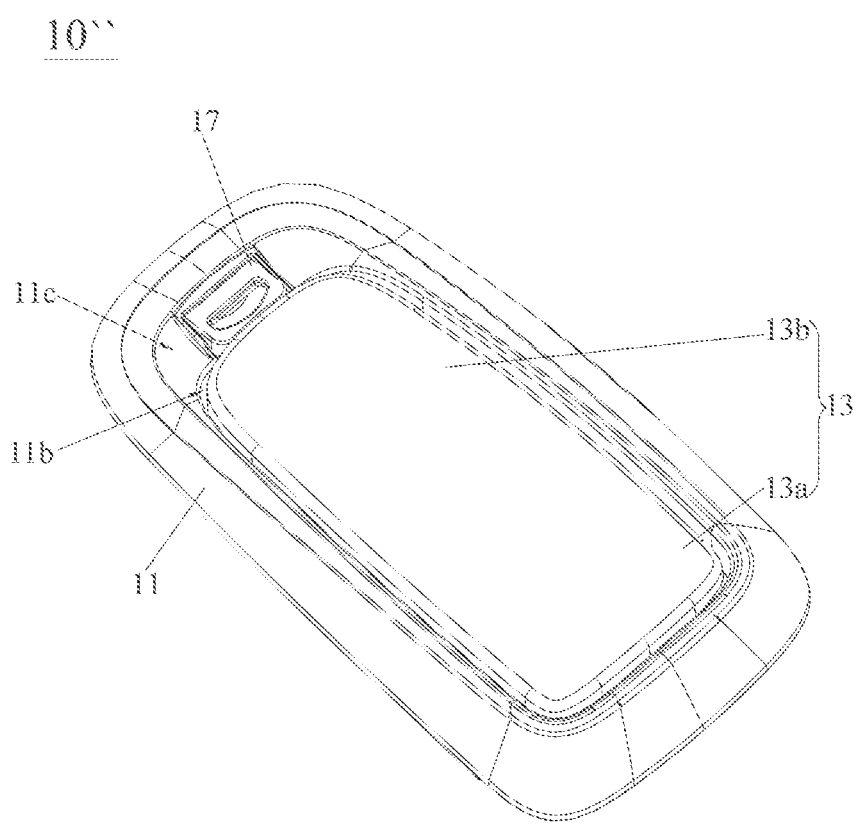
FIG. 13 is a perspective structural view of the side impact protection device according to a third embodiment of the disclosure when the side impact protection block is in the retracted position.
Figure 14:
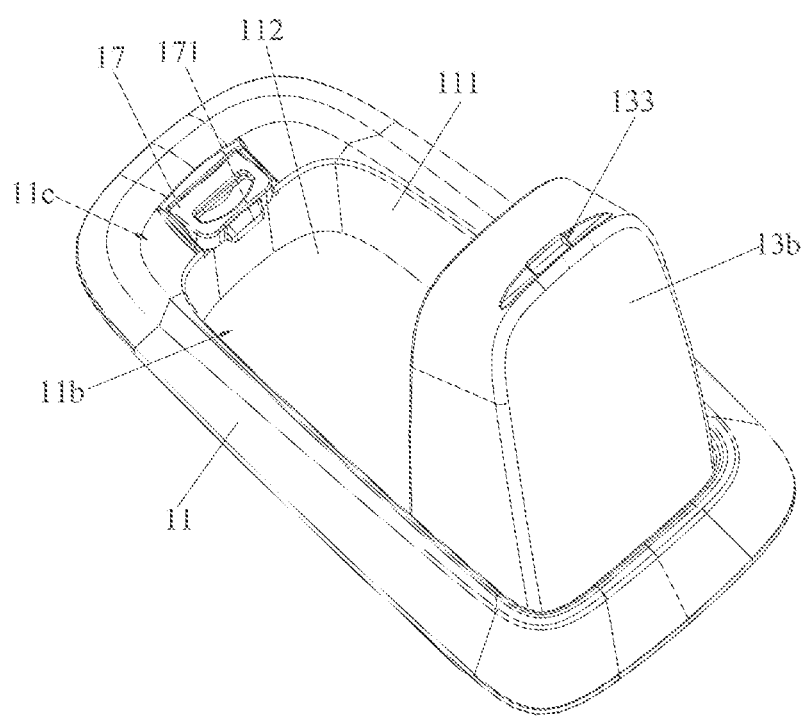
FIG. 14 is a perspective structural view of the side impact protection device according to the third embodiment of the disclosure when the side impact protection block is in the extended position.
Figure 15:
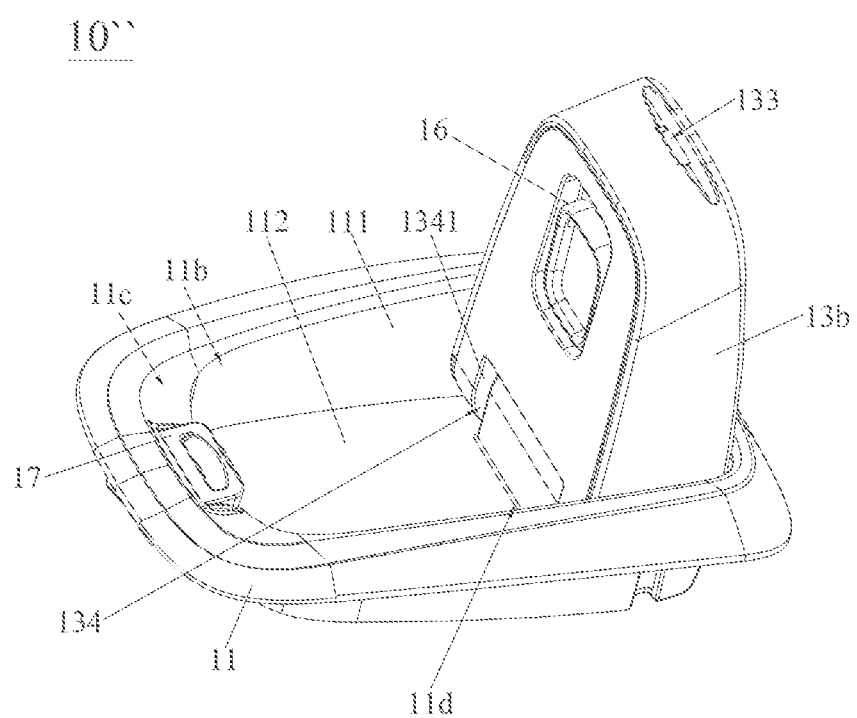
FIG. 15 is a perspective structural view of the side impact protection device shown in FIG. 14 at another angle.

With reference to FIGS. 13 to 20, the working principle of the side impact protection device of the third embodiment will be described as follows. When the side impact protection block 13 in the state shown in FIG. 13 or 16 is to be pivoted to the state shown in FIG. 14 or 15, at first, the operator causes the second unlocking operating member 17 to release buckling of the free end 13b of the side impact protection block 13; and next, a clockwise force is applied to the side impact protection block 13 in FIG. 13 or 16, such that the side impact protection block 13 is pivoted to the extended position around the axis C of the pivot shaft 12. When the side impact protection block 13 is pivoted to the extended position, the locking structure 131" at this time is automatically locked with the cooperative locking structure 11a" under the action of the elastic member 15 on the sliding member 14, such state is shown in FIG. 14 or 15. When the side impact protection block 13 in the state shown in FIG. 14 or 15 is to be switched to the state shown in FIG. 13 or 16, the operator at this time firstly operates the first unlocking operating member 16, so the first unlocking operating member 16 drives the sliding member 14 to retract inwardly by overcoming the elastic member 15, such that the locking structure 131" is released from locking with the cooperative locking structure 11a" by the inwardly retracting sliding member 14. Immediately afterwards, the side impact protection block 13 in FIG. 14 or 15 is pivoted counterclockwise until the locking structure 131" on the side impact protection block 13 is misaligned with the cooperative locking structure 11a". Then, the side impact protection block 13 is pivoted while being continuously kept in the original direction until the side impact protection block 13 is pivoted to the retracted position shown in FIG. 13 or 16; and in the process that the side impact protection block 13 is pivoted to the retracted position, the second unlocking operating member 17, by means of the inclined structure 172, is pushed by the free end 13b of the side impact protection block 13 to retract-inwardly slide. The reset structure 173 is compressed during the inwardly retracting process of the second unlocking operating member 17 to provide a reset force. When the buckle structure 171 of the second unlocking operating member 17 is aligned with the cooperative buckle structure 133, the reset structure 173 drives the second unlocking operating member 17 to slide closer to the free end 13b, such that the buckle structure 171 is automatically buckled with the cooperative buckle structure 133 by sliding of the second unlocking operating member 17, such state is shown in FIG. 16.

Compared with the related art, the side impact protection device 10 (10', 10") of the disclosure comprises the fixed seat 11 assembled on the backrest 21 and the side impact protection block 13 pivotally coupled to the fixed seat 11 via a pivot shaft 12. The side impact protection block 13 has at least an extended position and a retracted position during the process of pivoting around the axis C of the pivot shaft 12 in respect to the fixed seat 11, such that the side impact protection block 13 is out of the fixed seat 11 by pivoting in use, and is stored in the fixed seat 11 by pivoting while not in use, so the operation is simple and the structure is simple. Meanwhile, since one of the fixed seat 11 and the side impact protection block 13 has the locking structure 131 (131', 131"), and the other one of the fixed seat 11 and the side impact protection block 13 has the cooperative locking structure 11a (11a', 11a") cooperating with the locking structure 131, the locking structure 131 (131', 131") may be automatically locked with the cooperative locking structure 11a (11a', 11a") when the side impact protection block 13 is pivoted to the extended position around the axis, which on the one hand ensures the reliability of the side impact protection block 13 in use, and on the other hand makes the locking of the side impact protection block 13 in the extended position easier and faster.

It would be noted, according to actual requirements, the embedding bulge 11d and the embedding groove 134 in the first embodiment may be removed. In such case, the locking structure 131 or the cooperative locking structure 11a provided in the side impact protection block 13 is located at the axial end face 132 of the pivotal assembling end 13a, and the cooperative locking structure 11a or the locking structure 131 provided in the fixed seat 11 is located at the groove side wall 111 of the accommodating groove 11b, so the purpose of automatically locking the locking structure 131 and the cooperative locking structure 11a can also be realized. Specifically, there are at least two cooperative locking structures 11a and the at least two cooperative locking structures are spaced apart from each other along the circumferential direction (i.e., the direction indicated by arrow B in FIG. 5) of the pivot shaft 12. The locking structure 131 is automatically locked with one of the cooperative locking structures 11a when the side impact protection block 13 is pivoted to the extended position, and the locking structure 131 is automatically locked with the other one of the cooperative locking structures 11a when the side impact protection block 13 is pivoted to the retracted position. More specifically, an elastic cantilever 13c may further be provided on the axial end face 132 of the pivotal assembling end 13a (at which the locking structure 131 is located) or the groove side wall 111 of the accommodating groove 11b, and the locking structure 131 is located on the elastic cantilever 13c. During the process the side impact protection block 13 is switched between the extended position and the retracted position, the locking structure 131 is unlocked from or locked to the cooperative locking structure 11a by the elastic deformation of the elastic cantilever 13c. For example, the locking structure 131 may be a spherical bump, and the cooperative locking structure 11a may be a recess.

What disclosed above are only preferred embodiments of the disclosure, and the scope of the disclosure certainly cannot be limited by this. Therefore, any equivalent changes made according to the scope of the disclosure still belong to the disclosure.

What is claimed is:

1. A child safety seat comprising:
   a seating body, having a backrest; and
   a side impact protection device, disposed at the backrest, the side impact protection device comprising:
   a fixed seat assembled on the backrest; and
   a side impact protection block pivotally coupled to the fixed seat via a pivot shaft, the side impact protection block has at least an extended position and a retracted position during a pivoting process around an axis of the pivot shaft in respect to the fixed seat;
   wherein one of the fixed seat and the side impact protection block has a locking structure, and the other one of the fixed seat and the side impact protection block has at least two cooperative locking structures that cooperate with the locking structure, the at least two cooperative locking structures are spaced apart from each other along a circumferential direction of the pivot shaft; and
   wherein the locking structure is automatically locked with one of the cooperative locking structures when the side impact protection block is pivoted to the extended position around the axis, and the locking structure is automatically locked with the other one of the cooperative locking structures when the side impact protection block is pivoted to the retracted position,
   wherein the fixed seat has an accommodating groove matching the side impact protection block, the side impact protection block has a pivotal assembling end located in the accommodating groove and a free end connected to the pivotal assembling end, the pivot shaft is located at the pivotal assembling end, the free end is embedded into the accommodating groove when pivoting to the retracted position around the axis, and the free end is rotated out of the accommodating groove when pivoting to the extended position around the axis,
   wherein one of the pivotal assembling end and the fixed seat has an embedding bulge, and the other one of the pivotal assembling end and the fixed seat has an embedding groove being cooperating with the embedding bulge, the embedding bulge is located in the accommodating groove if the fixed seat has the embedding bulge, or the embedding groove is located at a groove bottom wall of the accommodating groove if the fixed seat has the embedding groove, and the pivot shaft passes through the embedding bulge and is assembled at a groove side wall of the embedding groove, and
   wherein the side impact protection device further comprises a sliding member and an elastic member, the sliding member is slidably arranged on the fixed seat or the side impact protection block at which the embedding groove is located along a direction intersecting an axial direction of the pivot shaft, the elastic member is disposed between the sliding member and the fixed seat or the side impact protection block at which the sliding member is located, the locking structure is formed at an end of the sliding member, the at least two cooperative locking structures are formed on a side wall surface of the embedding bulge, and during a process that the side impact protection block is switched between the extended position and the retracted position, the locking structure is unlocked form or locked with one of the cooperative locking structures by an elastic deformation of the sliding member being linked with the elastic member.

2. The child safety seat according to claim 1, wherein the locking structure or the at least two cooperative locking structures provided in the side impact protection block are located at an axial end face of the pivotal assembling end, and the at least two cooperative locking structures or the locking structure provided in the fixed seat are located at a groove side wall of the accommodating groove.

3. The child safety seat according to claim 2, wherein an elastic cantilever is further provided on the axial end face of the pivotal assembling end at which the locking structure is located or on the groove side wall of the accommodating groove, the locking structure is located on the elastic cantilever, and during a process that the side impact protection block is switched between the extended position and the retracted position, the locking structure is unlocked from or locked with one of the cooperative locking structures by an elastic deformation of the elastic cantilever.

4. The child safety seat according to claim 3, wherein the locking structure is a spherical bump and each of the at least two cooperative locking structures are recesses.

5. The child safety seat according to claim 1, wherein the at least two cooperative locking structures or the locking structure provided in the fixed seat are located at a groove side wall of the embedding groove or an axial end face of the embedding bulge, and the locking structure or the at least two cooperative locking structures provided in the side impact protection block are located at the groove side wall of the embedding groove or the axial end face of the embedding bulge.

6. The child safety seat according to claim 5, wherein the locking structure is automatically locked with one of the cooperative locking structures when the side impact protection block is pivoted to the extended position, and the locking structure is automatically locked with the other one of the cooperative locking structures when the side impact protection block is pivoted to the retracted position.

7. The child safety seat according to claim 6, wherein an elastic cantilever is further provided on the groove side wall of the embedding groove at which the locking structure is located or on the axial end face of the embedding bulge at which the locking structure is located, the locking structure is located on the elastic cantilever, and during a process that the side impact protection block is switched between the extended position and the retracted position, the locking structure is unlocked from or locked with one of the cooperative locking structures by an elastic deformation of the elastic cantilever.

8. The child safety seat according to claim 1, wherein the fixed seat has an avoidance space for pulling out the free end of the side impact protection block embedded in the accommodating groove.

9. The child safety seat according to claim 1, wherein the embedding bulge has an arch-shape.

10. The child safety seat according to claim 1, wherein an outer profile of a cross-section of the locking structure is an arc-shaped protrusion, each of the at least two cooperative locking structures are toothed structures having at least two tooth slots, an axial direction of the toothed structure is the same as an axial direction of the pivot shaft, the arc-shaped protrusion is automatically locked with one of the tooth slots when the side impact protection block is pivoted to the extended position, and the arc-shaped protrusion is automatically locked with the other one of the tooth slots when the side impact protection block is pivoted to the retracted position.

11. The child safety seat according to claim 1, wherein the side impact protection device further comprises a first unlocking operating member linked with the sliding member, the first unlocking operating member is located on the side impact protection block, and the first unlocking operating member makes the locking structure be unlocked from one of the cooperative locking structures by linking with the sliding member,
wherein the first unlocking operating member is located on a side of the side impact protection block facing the groove bottom wall of the accommodating groove.

12. The child safety seat according to claim 11, wherein the side impact protection device further comprises a second unlocking operating member which is slidably arranged at one of the fixed seat and the free end and has a buckle structure, the other one of the fixed seat and the free end has a cooperative buckle structure, and the buckle structure is buckled with the cooperative buckle structure when the side impact protection block is pivoted to the retracted position.

13. The child safety seat according to claim 12, wherein the second unlocking operating member has an inclined structure being inclined in respect to a sliding direction of the second unlocking operating member, the inclined structure is adjacent to the buckle structure, and during a process that the side impact protection block is pivoted to the retracted position, the free end pushes the inclined structure to slide the second unlocking operating member in a direction away from the free end.

14. The child safety seat according to claim 13, wherein the second unlocking operating member further has a limit structure for blocking the second unlocking operating member to a sliding limit toward the free end, and the limit structure is protruded on the second unlocking operating member.

15. The child safety seat according to claim 12, wherein an elastic reset structure is provided between the second unlocking operating member and the free end or the fixed seat at which the second unlocking operating member is located, the elastic reset structure constantly has a tendency to drive the buckle structure to be automatically buckled with the cooperative buckle structure.

* * * * *